US010229055B2

(12) United States Patent
Li et al.

(10) Patent No.: US 10,229,055 B2
(45) Date of Patent: Mar. 12, 2019

(54) ADAPTIVE SPANNING CONTROL

(71) Applicant: Seagate Technology LLC, Cupertino, CA (US)

(72) Inventors: Peng Li, Shakopee, MN (US); David Scott Ebsen, Minnetonka, MN (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 135 days.

(21) Appl. No.: 14/527,013

(22) Filed: Oct. 29, 2014

(65) Prior Publication Data

US 2016/0124846 A1    May 5, 2016

(51) Int. Cl.
*G06F 12/02* (2006.01)

(52) U.S. Cl.
CPC ...... *G06F 12/0253* (2013.01); *G06F 12/0246* (2013.01); *G06F 2212/1044* (2013.01); *G06F 2212/2022* (2013.01); *G06F 2212/7205* (2013.01)

(58) Field of Classification Search
CPC ............ G06F 12/0246; G06F 12/0253; G06F 2212/1044; G06F 2212/2022; G06F 2212/7205
USPC .................................................. 711/103, 201
See application file for complete search history.

(56) References Cited

U.S. PATENT DOCUMENTS

| 8,296,625 B2* | 10/2012 | Diggs | G06F 11/1068 714/723 |
|---|---|---|---|
| 8,364,929 B2 | 1/2013 | Haines et al. | |
| 8,898,548 B1* | 11/2014 | Mullendore | G06F 11/1048 365/185.09 |
| 8,977,804 B1* | 3/2015 | Horn | G06F 11/008 711/103 |
| 2003/0037299 A1* | 2/2003 | Smith | G06F 11/1012 714/763 |
| 2009/0144598 A1* | 6/2009 | Yoon | G11C 16/3418 714/752 |
| 2009/0254695 A1* | 10/2009 | Deguchi | G06F 3/061 711/100 |
| 2011/0099321 A1* | 4/2011 | Haines | G06F 12/0246 711/103 |
| 2012/0278533 A1* | 11/2012 | Suzuki | G11C 16/3404 711/103 |
| 2014/0281260 A1* | 9/2014 | Peterson | G06F 3/0616 711/135 |

OTHER PUBLICATIONS

Micron Technology, Inc. "TN-2960: Garbage Collection in SLC NAND Flash Memory", updated Oct. 2010.*
A. Ghilardelli and S. Corno, "Flash cards" in "Inside NAND Flash Memories", 2010, Springer, pp. 483-513.*

* cited by examiner

*Primary Examiner* — Reginald G Bragdon
*Assistant Examiner* — Aaron D Ho
(74) *Attorney, Agent, or Firm* — Holzer Patel Drennan

(57) ABSTRACT

The disclosed technology provides for a solid state device that adaptively determines, responsive to receipt of a write command, whether or not to partition one or more individual logical blocks of data between multiple pages of a flash storage device. According to one implementation, the partitioning (e.g., spanning) determination is based on read frequency characteristics and the internal error correction code rate of the data.

17 Claims, 4 Drawing Sheets

ADAPTIVE SPANNING CONTROL

BACKGROUND

Solid state drives (SSDs) are a type of nonvolatile semiconductor memory device that store data values as threshold voltages in a number of memory cells. Multiple cells are grouped into a page, which represents the smallest physically addressable data units for programming and reading operations. Each page of the SSD device may include a number of extra cells that are not normally utilized to store user data. For example, an SSD page may include spare cells that can be used for storing parity bits of error correction codes. To efficiently utilize storage space, some SSD devices employ a spanning technique. Spanning generally refers to writing different portions of data of one LBA to two different pages. For example, a first LBA may be stored in a first page; a second LBA may be stored in a second page adjacent to the first page; and a third LBA may be stored partially within extra cells of the second page and partially in a third page adjacent to the second page.

SUMMARY

Implementations described and claimed herein provide for receiving an instruction to write logical blocks of data to a flash storage device and to determine, in response to receipt of the instruction, whether to partition at least one of the logical blocks between two or more pages of the flash storage device based on read frequency characteristics of data and the internal error correction code rates.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

DETAILED DESCRIPTION

Figure 1:
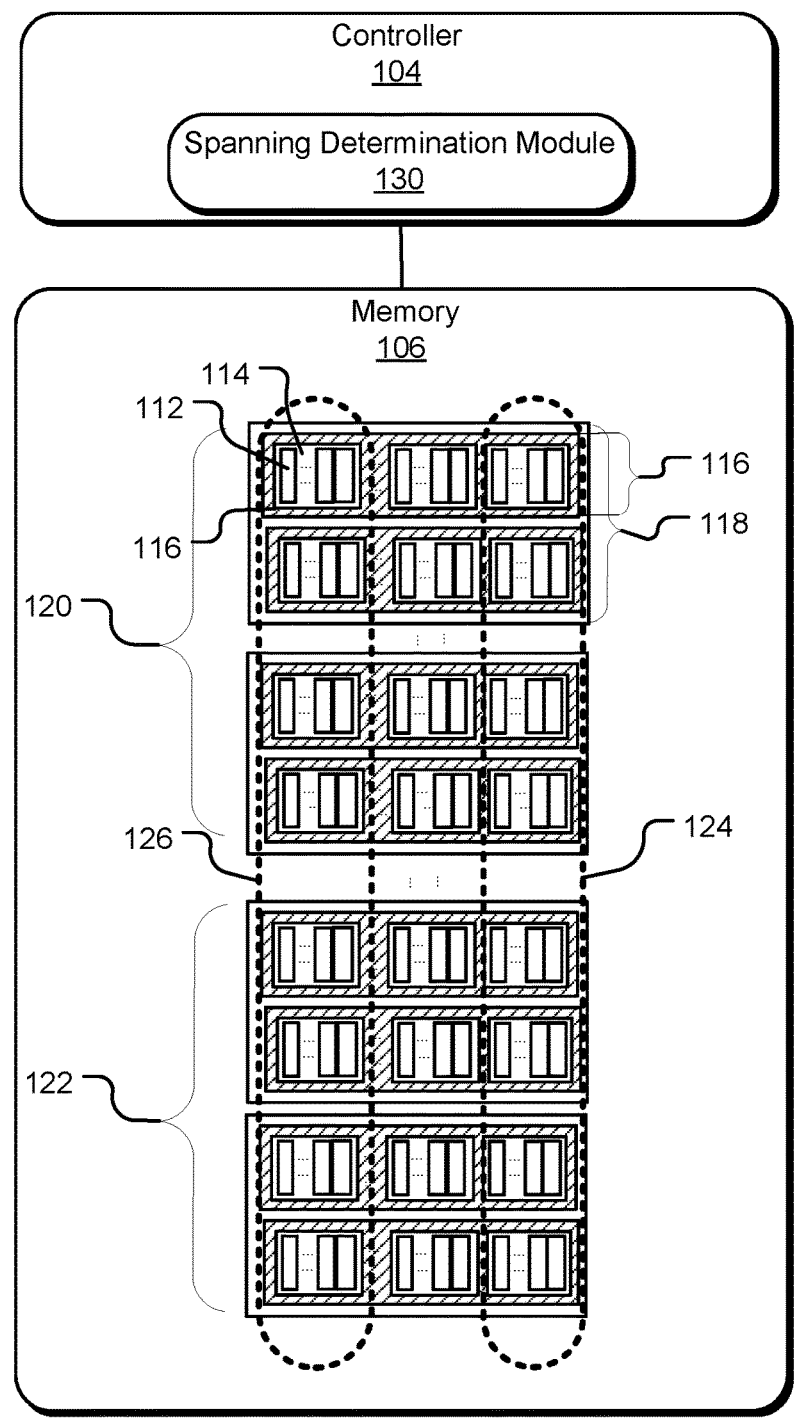
FIG. 1 illustrates an example solid state drive (SSD) for implementing adaptive spanning control in a memory device.

FIG. 1 illustrates an example solid state drive (SSD) 100 including a controller 104 and a memory 106. The SSD 100 may be, for example a flash based SSD such that the memory 106 is flash memory. The memory 106 comprises multiple analog memory cells (not shown) that each hold a continuous, analog value such as an electrical voltage or charge. In various implementations, memory 106 may comprise a number of different types of analog memory cells, such as, NAND, NOR, MRAM, ferroelectric RAM, magnetic RAM, spin-torque transfer RAM, resistive RAM, phase change memory, etc.

Memory cells of the SSD 100 are categorized according to location and structure of the SSD 100. For example, memory cells of the SSD 100 can be referred to according to a specific channel (e.g., a channel 120 or 122), a specific die (e.g., a die 118), a specific plane (e.g., a plane 116), or a specific block (e.g., a block 114). Each block of data includes a number of individually programmable pages (e.g., a page 112), representing the smallest physically addressable data unit for programming and reading operations of the SSD 100.

Although pages can be individually programmed, the SSD 100 performs erasures at the block level, erasing all pages in the block as a single unit. Updating a single page can therefore be accomplished in at least two ways: (1) by erasing and re-writing all pages in an associated block; or (2) by writing the updated data of the single, updated page to an empty page in a new physical location. To reduce computation overhead and write latencies, the second option may be utilized more frequently.

In one example implementation, the controller 104 maps a logical block address (LBA) of an old page to a new page, marks the old page as invalid/stale, and writes updated data of the LBA to the new page. After some time, numerous data storage units within a block (e.g., the block 114) may be marked as stale. As a result, it may make sense to move all valid data out of the block (e.g., or a grouping of blocks) to a new location, erase data in the block(s), and thereby make the block(s) freshly available for programming. This process of tracking invalid/stale pages, moving valid data pages from old blocks to new blocks, and erasing old blocks is sometimes referred to as "garbage collection."

Garbage collection is performed on garbage collection units (GCUs) such as the example GCUs 124 and 126. A GCU generally refers to a physical unit that is garbage collected and erased as a contiguous unit. In some flash memory implementations, the smallest size of a GCU is one block (e.g., block 114). However, a GCU may be of any size, and include pages in any number of blocks, planes, dies, or channels. In the illustrated example, each of the GCUs 124 and 126 includes one block from each plane (e.g., the plane 116) of the SSD 100.

In one implementation, the controller 104 uses the same code rate to read data from all pages in a same GCU. A "code rate" of a data unit (e.g., a page) refers to a ratio of the user data stored in the data unit to the sum of the user data and a number of parity bits stored in the data unit used for executing an error correction code (ECC). Compared to low code rates, high code rates utilize fewer parity bits and have a lower correction capability.

The controller 104 comprises hardware and/or firmware capable of executing a computer program product embodied in a tangible computer-readable storage medium to execute a computer process. As used herein, tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can accessed by mobile device or computer. In contrast to tangible computer-readable storage media, intangible computer-readable communication signals may embody computer readable instructions, data structures, program modules or other data resident in a modulated data signal such as a carrier wave or other signal transport mechanism. The controller 104 may include, for example, one or more processors, microprocessors, digital signal processors (DSPs), application specific integrated circuits (ASICs), field programmable gate arrays (FPGAs), or any other equivalent integrated or discrete logic circuitry for performing the functions ascribed to the controller 104. In other examples, a computing device (not shown) coupled to the SSD 100 may implement some or all of the functionality ascribed to the controller 104.

The controller 104 writes data to the SSD 100 using a logical block address (LBA) scheme of a host device (not shown). In some implementations, the controller 104 associates each LBA with a single page (e.g., the page 112) of the memory 106. This storage technique is referred to as "non-spanning storage." A "non-spanned page" is a page that does not include data of any LBA partitioned between two or more pages. Non-spanned pages may include a number of spare cells that are not initially allocated for storage of user data. These spare bits may be used, for example, for storage of ECC parity bits, such as bits that may be used if the controller 104 elects to implement a decreased code rate. For example, an ECC with a lower code rate may be selectively implemented when the SSD 100 ages, and more and more read errors occur.

In other implementations, the controller 104 writes different portions of data of one LBA to two different pages. This storage technique is referred to as "spanning storage." As used herein, a "spanned page" is a page including data of an LBA that is partitioned between two or more pages. For example, a first LBA may be stored in a first page; and a second LBA may be stored partially within unused cells of the first page and partially in a second page adjacent to the first page. Alternatively, there may be a scenario in which the system uses an extremely low code rate and there are no longer enough usable (e.g., good) cells to write an entire LBA and its corresponding ECC parity bits to the individual page. In such case, the data of the LBA may be partitioned between two adjacent pages using a spanning technique.

Responsive to receipt of an instruction to read or write data to the memory 106, a spanning determination module 130 of the controller 104 determines a method of data management (e.g., spanning or non-spanning) for each data write instance to the memory 106. Spanning allows for a more efficient utilization of memory cells in the SSD 100. However, this increased storage efficiency is achieved at the cost of a decrease in device performance. According to one implementation, reading user data of a spanned page entails reading all pages "linked" by the spanning. If, for example, an LBA is partitioned between two adjacent pages, the controller 104 reads both of the pages to extract any data from either page. Reading multiple spanned pages in an individual read operation is more processor-intensive than reading an individual non-spanned page. Therefore, increased read and write latencies may be associated with read and write operations of spanned pages.

Implementations disclosed herein provide for adaptive spanning control that takes advantage of benefits achieved by both spanning and non-spanning storage techniques. In one implementation, the spanning determination module 130 performs a real-time assessment of data in a GCU to determine whether to enable or disable spanning for a write operation. For example, spanning may be selectively disabled when data affected by a write operation is read intensive and drive performance (e.g., speed) is of higher priority than efficient space utilization. Likewise, the spanning determination module 130 may selectively enable spanning when data affected by a write operation is not read intensive and/or when drive performance is of decreased priority.

In the following implementations, "spanning" is discussed primarily with respect to a GCU unit of granularity. That is, the spanning determination module 130 may determine whether to enable or disable spanning for an entire GCU. The GCU is an efficient unit for data management because flash pages allocated to the same GCU may have the same characteristics. For example, it may take a same or substantially similar amount of time to program or erase all of the data blocks in a same GCU. However, other implementations may selectively enable spanning in granularity units smaller than a GCU. For example, an individual GCU may heterogeneously include one or more spanned pages and one or more non-spanned pages.

Figure 2:
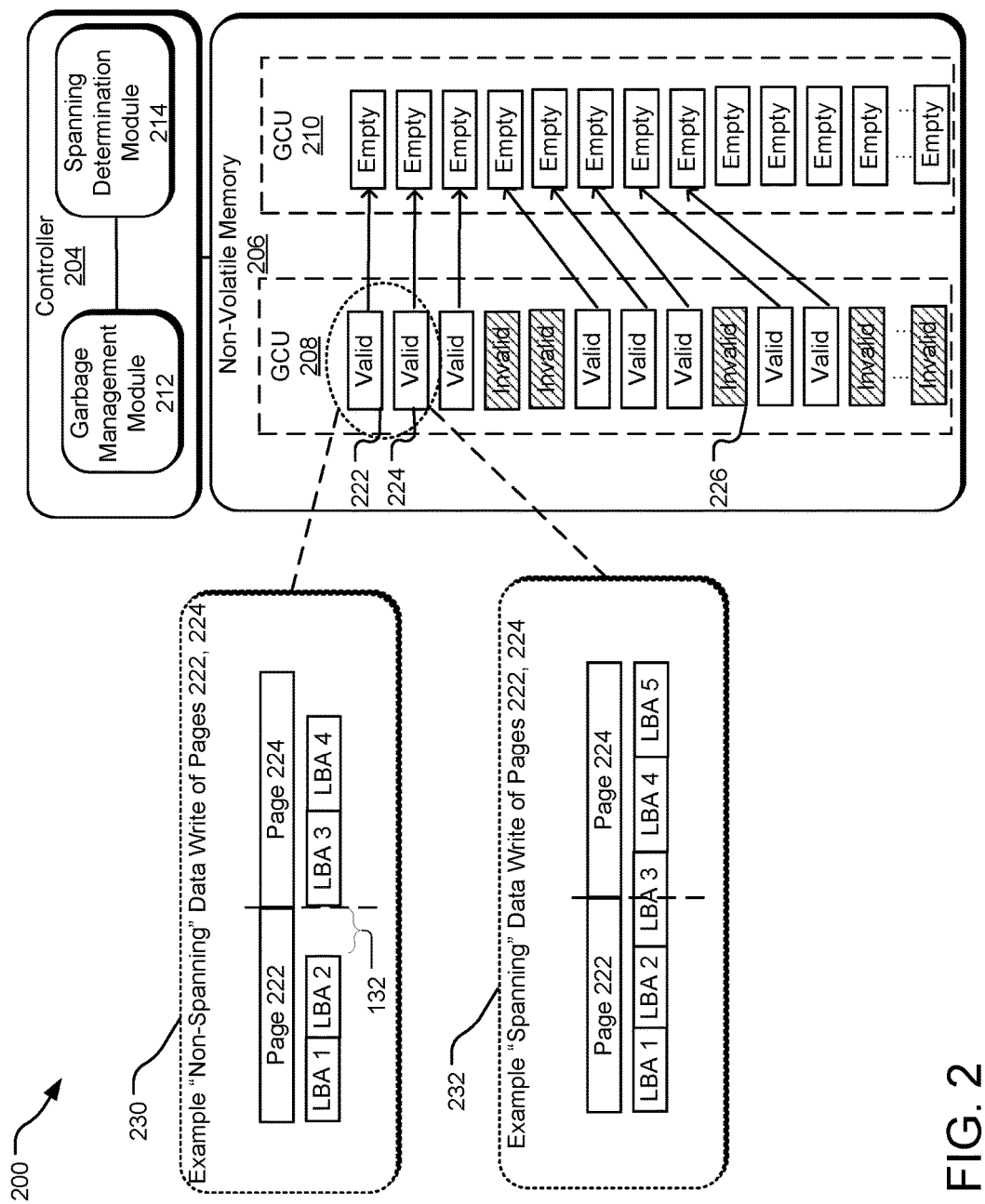
FIG. 2 illustrates a garbage collection operation in an example SSD including a controller for implementing adaptive spanning in a non-volatile memory.

FIG. 2 illustrates a garbage collection operation in an example solid state drive (SSD) 200 including a controller 204 and a non-volatile memory 206. The non-volatile memory 206 includes a number of different garbage collection units (e.g., GCU 208, 210) defined by firmware of the SSD 200. In one implementation, the GCUs 208 and 210 are preselected, static data units. In another implementation, the GCUs 208 and 210 can be re-defined by the controller 204 one or more times throughout the life of the SSD 200. Each of the GCUs includes a number of pages (e.g., pages 222, 224, 226) that may belong to the same or different blocks, planes, dies, or channels (e.g., as shown in FIG. 1).

When the controller 204 executes a command to update data in a page (e.g., a page 222), a garbage management module 212 may, in some cases, decide to write the updated data to an empty page in a different location (e.g., in a different block which may be in a different plane, die, channel, or GCU). For example, if the update entails changing data in only a few pages of one data block, it may be more efficient to move data of the updated pages to a different location than to erase and rewrite the data block. When data of a page is written to a new location, the garbage management module 212 marks the original page as invalid (e.g., stale).

After some time, numerous pages within a GCU may be marked as invalid (e.g., stale), as shown by invalid and valid data blocks indicated in GCU 208. When a ratio of invalid to valid pages in an individual GCU reaches a predefined threshold, the garbage management module 212 initiates a garbage collection operation. In the illustrated garbage collection operation, the garbage management module 212 identifies and moves all valid pages of the GCU 208 to the GCU 210. After moving the valid pages, all data in the GCU 208 can be erased to make room for new data. Remaining empty pages in the GCU 210 can be filled with valid data of another GCU (not shown).

Due to flash memory cell degradation, the effective lifespan of the SSD 200 is reduced in proportion to a number of garbage collection operations that the garbage management module 212 performs. Enabling spanning is one way to decrease the number of garbage collection operations performed and extend the effective lifespan of the SSD 200. Spanning more efficiently utilizes space by distributing host LBAs over fewer total pages in the SSD 200.

Exploded view 230 illustrates an example rewrite of data stored in pages 222 and 224 when spanning is disabled. Each of the pages 222 and 224 stores two LBAs (e.g., 1-2, and 3-4, respectively). Because each of the pages has a greater storage capacity than the total size of the associated LBAs, pages 222 and 224 each have a number of spare memory cells (e.g., as illustrated by a gap 132). Exploded view 232 illustrates an example rewrite of data in pages 222 and 224 when spanning is enabled. Each of the pages 222 and 224 stores two full LBAs (e.g., 1-2, and 4-5, respectively) and a portion of a third LBA (LBA 3), which is partitioned between each of the pages 222 and 224.

A spanning determination module 214 of the controller 204 determines whether or not to enable spanning for an associated garbage collection command. In one implementation, the spanning determination module 214 enables spanning for some valid pages in the GCU 208 and disables spanning for other valid pages in the GCU 208 so that the GCU 210 includes a heterogeneous mixture of spanned and non-spanned data after the illustrated garbage collection operation.

In another implementation, the spanning determination module 214 enables or disables spanning for all data in the GCU 208 so that the GCU 210 contains either exclusively spanned data or exclusively non-spanned data after the illustrated garbage collection operation. Flash pages allocated to the same GCU tend to have the same or similar code rates and read intensiveness. Therefore, managing spanning at the GCU level can reduce processing overhead, such as overhead in the firmware computation and in computation relating to flash page headers. For example, a spanning/non-spanning flag is, in some implementations, stored in a flash page header of every page. However, if spanning is managed at the GCU level, a single spanning/non-spanning flag may suffice to designate all pages in a GCU as either "spanned" or "non-spanned."

To determine whether or not to enable spanning for a write unit, the spanning determination module 214 analyzes a number of factors described in detail below. The term "write unit" refers to, for example, two or more pages of a flash storage device capable of being written to via a single write operation. In one implementation, the write unit is a garbage collection unit (e.g., 208 or 210). In other implementations, the write unit is smaller than a garbage collection unit.

In one implementation, the spanning determination module 214 considers a read-intensiveness of data of a write unit. "Read-intensiveness" is measured based on one or more read frequency characteristics. As used herein, a "read frequency characteristic" refers to a frequency with which data is read. For example, one read frequency characteristic is how often a given page in the write unit is read. Another read frequency characteristic quantifies a volume of data that is frequently accessed. For example, the controller 204 may quantify the number of valid pages in a write unit that are read by the controller 204 with a frequency that exceeds a predetermined threshold.

Based on one or more read frequency characteristics, the spanning determination module 214 classifies data of a write unit as either "read intensive" or "not read intensive." In one implementation, the spanning determination module 214 determines that data in a write unit (e.g., the GCU 208) is read intensive if more than half of the pages in the write unit are valid and if each valid page has been read at least twice in some recent time interval (e.g., at a time before the write unit is garbage collected).

If a write unit is particularly read-intensive and likely to be frequently accessed by the controller 204, decreasing read latencies of such data may be of higher priority than if the data is likely to be read less frequently. Therefore, a determination that a write unit is read intensive may weigh (either alone, or when considered with other factors) against enabling spanning. On the other hand, a determination that a write unit is not read intensive may weigh (alone, or when considered with other factors) in favor of enabling spanning.

In another implementation, the spanning determination module 214 considers a code rate of data in the write unit. A high code rate (indicating a lower error correction power) may tend to be used when write unit (e.g., flash page, GCU, etc.) has had fewer total write operations over the course of its lifetime. Therefore, a high code rate can indicate that the write unit is at a stage in life when high endurance (e.g., preserving lifespan longevity) is of less concern. When the write unit is young, a user may prefer that the SSD 200 read data as quickly as possible. Therefore, a determination that a code rate of the write unit is relatively high may also weigh against the decision to enable spanning.

As the write unit endures more write operations, high endurance may become more important. For example, a user may prefer that the controller 204 automatically take steps to extend the lifetime of each write unit in the SSD 200 (e.g., by enabling spanning) at the cost of decreased performance (e.g., increased read latencies). Because lower code rate tend to be used for older write units, a relatively low code rate may indicate that a write unit is a good candidate for spanning Therefore, a determination that a code rate of a write unit is relatively low may weigh in favor of enabling spanning.

In one implementation, the spanning determination module 214 determines whether the code rate of the page exceeds a code rate threshold. Because all pages in each GCU have the same or similar characteristics, the code rate of an individual page is also representative of the code rate of the GCU as a whole.

The code rate threshold can be computed using the size of a page in the SSD 200, the size of a user data logic sector, and the code rate associated with the page. In the following discussion, the variable P refers to a size of a page; the variable L refers to the size of the user data logic sector; and the variable S represents the number of spare bytes in the page. Another variable, N, represents a number of non-spanning logic sectors that can be stored in the page, where N can be defined as:

$$N = \text{FLOOR}[P/L] \qquad (1)$$

For example, if a NAND flash page size (P) is 18592 bytes, and the user logic sector size (L) is 4096 bytes, N=4.

In one implementation, the code rate threshold is set to:

$$\frac{N*L}{P} \qquad (2)$$

or:

$$1 - \frac{S}{P} \qquad (3)$$

If high endurance (e.g., extending lifespan as much as possible) is of high priority, this threshold can be altered accordingly, such as by the expression:

$$\frac{N*L+\alpha}{P} \qquad (4)$$

where $\alpha$ is a constant. When the code rate is below the code rate threshold (e.g., Eq. 2, 3, or 4), the page has enough spare bytes to add parity bits for the current code rates. In Equation (4), the maximum value of $\alpha$ is P−N*L (e.g., in the scenario where the code rate threshold is 1). For example, if the page size (P) is 18592 bytes, the size of the user data logic sector (L) is 4096 bytes, and N=4, $\alpha$ may be set to 1000. Using equation (4) above, the code rate threshold in this scenario is 93.5%. The number of available parity bits in a page is given by the difference between the user data size (e.g., 4*4096) divided by the code rate and the user data size (e.g., 4*4096). If a page has a code rate of less than 93.5%, for example, 90%, then the number of used parity bits is given by: 4*4096/0.9−(4*4096)=1821parity bits, which is smaller than the available parity bits in the page (e.g., 18592−4*4096=2208).

The above example describes calculating a code rate threshold for an individual page. Because all pages in a same GCU have the same or substantially similar characteristics, this code rate threshold is representative of the code rate threshold for the entire GCU.

In one implementation, spanning is disabled when the data of the write unit is both read intensive and has a code rate that exceeds the predetermined threshold. If both of these conditions are not satisfied, spanning is enabled for the write unit. If, for example, the write unit is a NAND flash page with a page size (P) of 18592 bytes and the user data logic sector size (L) is 4096 bytes, then Equation 2 (above) yields a code rate threshold of (4×4096)/18952=0.864. Table 1 illustrates example spanning control at the GCU level with an example code rate threshold of 0.864. When a GCU is read intensive and has a code rate that exceeds the code rate threshold, spanning is disabled. Otherwise, spanning is enabled.

TABLE 1

Spanning control at the GCU Level

| GCU #ID | Code Rate | Read-Intensive? | Spanning Control |
|---|---|---|---|
| 1 | 0.916 | Yes | Disable |
| 2 | 0.944 | Yes | Disable |
| 3 | 0.916 | No | Enable |
| 4 | 0.916 | Yes | Disable |
| 5 | 0.944 | Yes | Disable |
| 6 | 0.860 | Yes | Enable |
| 7 | 0.888 | Yes | Disable |
| 8 | 0.804 | No | Enable |

In another implementation, the spanning determination module 214 disables spanning in a write unit whenever data in the write unit is read intensive, regardless of code rate. If the code rate is so low that there is not enough available space to store data and the associated parity bits in a write unit, data of one or more LBAs may be discarded or saved elsewhere to permit the remaining data to be stored in a non-spanned format. If, for example, the code rate of LBA 1 and LBA 2 is so low that LBA 1 and LBA 2 cannot fit exclusively within the page 222, the controller 204 has two choices: the controller 204 can either enable spanning to partition LBA 2 between pages 222 and 224; or the controller 204 can discard or remap data of LBA 2 so that page 222 is a non-spanned page storing exclusively data of LBA 1. The former option may be elected in some implementations where decreasing read latencies is of higher priority than efficient space utilization.

Figure 3:
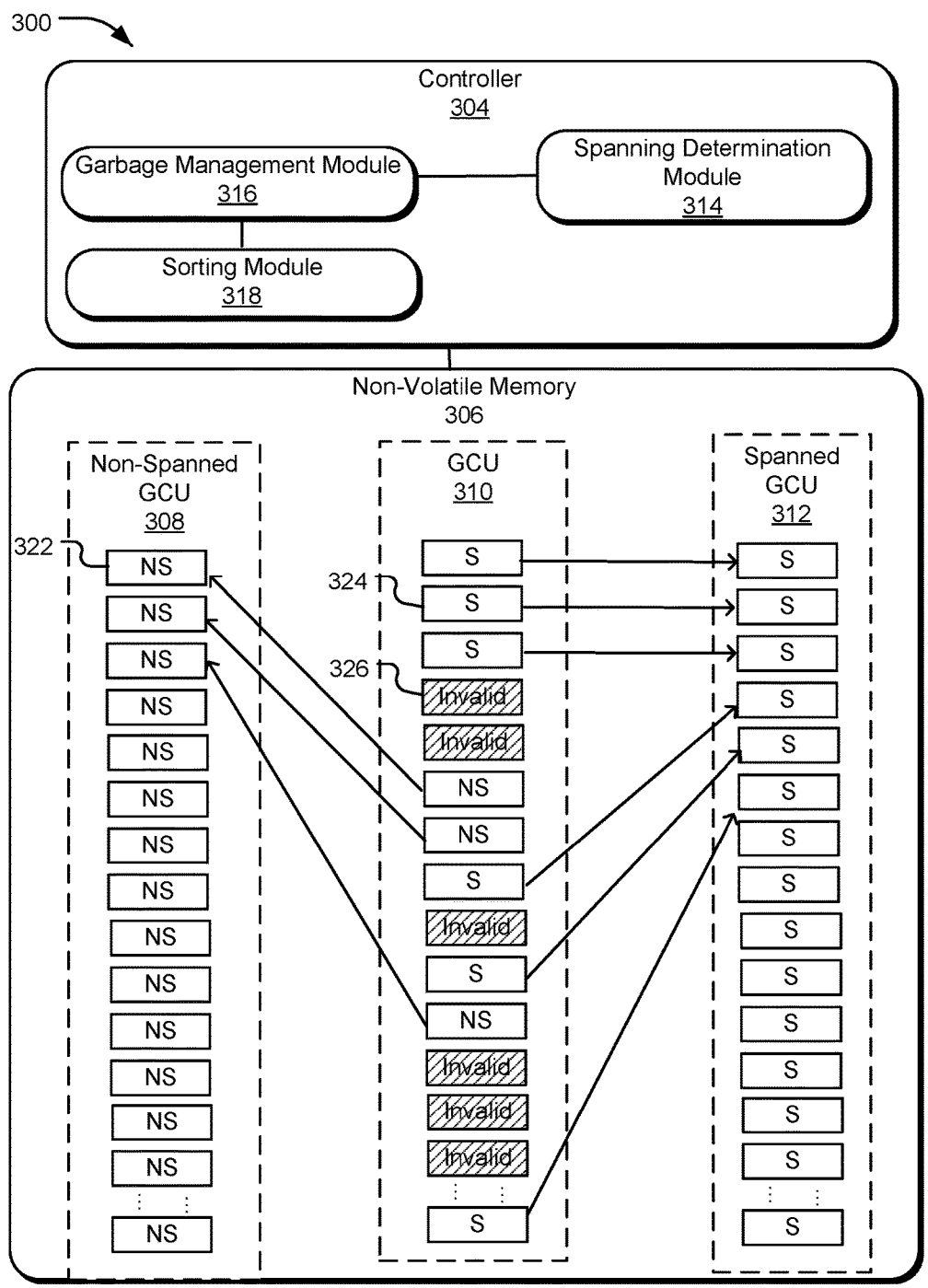
FIG. 3 illustrates another example garbage collection operation in an example SSD including a controller for implementing adaptive spanning in a non-volatile memory.

FIG. 3 illustrates another example garbage collection operation in an example solid state drive (SSD) 300 including a controller 304 and a non-volatile memory 306. The memory 306 includes a number of different garbage collection units (e.g., GCU308, 310, and 312) defined by firmware of the SSD 300. Each of the GCUs includes a number of pages (e.g., pages 322, 324, 326). The individual pages of each GCU may belong to the same or different blocks, planes, dies, or channels (e.g., as shown in FIG. 1).

The GCU 310 illustrates several invalid pages (e.g., the invalid page 326) including stale data that has been updated and written to another storage location. When a ratio of invalid to valid pages in an individual GCU reaches a predefined threshold, a garbage management module 316 of the controller 304 initiates a garbage collection operation. In the illustrated garbage collection operation, the garbage management module 316 identifies and moves all valid pages of the GCU 310 to either the GCU 308 or the GCU 312. To determine into which of the GCUs 308 or 312 to move each page of the GCU 310, a spanning determination module 314 determines whether to enable or disable spanning for that page and a sorting module 318 sorts the pages accordingly. For example, the spanning determination module 314 determines whether each page of the GCU 310 is to be rewritten in a spanned (S) or non-spanned (NS) format. This determination is made based on a variety factors, including those factors discussed above with respect to FIG. 2 (e.g., read intensiveness and code rate). The sorting module 318 sorts the pages and writes the data of the non-spanned pages to the GCU 308 and the spanned pages to the GCU 312.

In one implementation, the GCU 310 includes data in both non-spanned and spanned format prior to the illustrated garbage collection operation. For example, the garbage collection operation may effectively sort the spanned data from the non-spanned data into the different GCUs 308 and 312.

In another implementation, the GCU 310 includes data of a single, homogenous format (e.g., all spanned or all non-spanned) prior to the illustrated garbage collection operation. For example, the GCU 310 may include exclusively non-spanned data, but the spanning determination module 314 determines whether or not to span some of the pages during garbage collection. The non-spanned pages are written to the GCU 310 and the spanned pages are written to the GCU 312. After moving the valid pages, all data in the GCU 310 can be erased to make room for new data.

Figure 4:
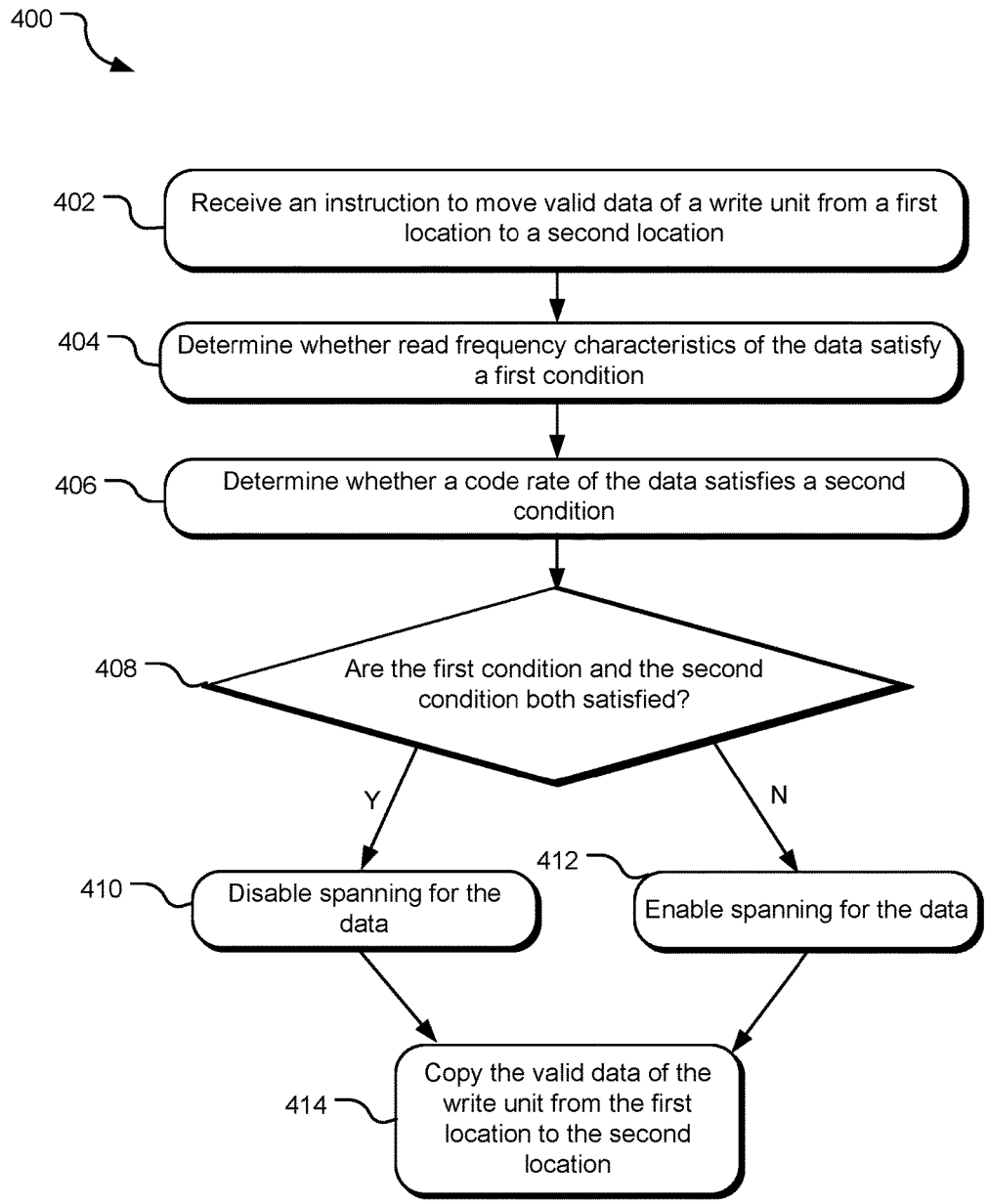
FIG. 4 illustrates example operations for managing adaptive spanning in a storage device.

FIG. 4 illustrates example operations 400 for managing adaptive spanning control in a storage device. A receiving operation 402 receives an instruction to move valid data from a first write unit (e.g., a GCU) to another write unit in the storage device. Responsive to the receiving operation 402, a determination operation 404 determines whether read frequency characteristics of the write unit satisfy a first condition. For example, the first condition may be satisfied if a certain percentage of memory cells within the write unit include valid data and have been accessed with a frequency that exceeds a predetermined threshold.

Another determination operation 406 determines whether a code rate of the data unit satisfies a second condition. For example, the second condition may be satisfied if a code rate of the write unit exceeds a predetermined threshold. A decision operation 408 decides whether the first condition and the second condition are both satisfied. If the first condition and the second condition are both satisfied, a disabling operation 410 disables a spanning option for the write unit. For example, the disabling operation 410 may save a flag in association with the write unit to indicate that data of the write unit is non-spanned data.

If one or both of the first condition and the second condition are not satisfied, an enabling operation 412 enables a spanning operation for the write unit. For example, the enabling operation 412 may save a flag in association with the write unit to indicate that data of the write unit is spanned data. A copying operation 414 copies the valid data of the write unit from the first location to the second location, per the instructions received via the receiving operation 402.

The implementations of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:
    responsive to receiving an instruction to write multiple logical blocks of data to a flash storage device, determining whether a read frequency characteristic of the data and a code rate of the data satisfy predetermined criteria;
    writing the data by partitioning at least one of the multiple logical blocks between two or more pages of the flash storage device responsive to a determination that the read frequency characteristic of the data and the code rate of the data satisfy the predetermined criteria; and
    writing the data without partitioning any of the multiple logical blocks responsive to a determination that the read frequency characteristic of the data and the code rate of the data do not satisfy the predetermined criteria.

2. The method of claim 1, further comprising storing the multiple logical blocks in a same garbage collection unit (GCU) of a storage device.

3. The method of claim 1, further comprising:
    writing one or more of the logical blocks to at least one of a garbage collection unit (GCU) including exclusively spanned pages and a GCU including exclusively non-spanned pages.

4. The method of claim 2, further comprising:
    determining whether a ratio of valid data to invalid data of the GCU satisfies a first condition; and
    determining whether a read frequency of the valid data satisfies a second condition.

5. The method of claim 4, further comprising:
    determining whether a code rate of the GCU satisfies a third condition.

6. The method of claim 5, further comprising:
    disabling spanning if each of the first condition, the second condition, and the third condition are satisfied.

7. The method of claim 1, further comprising:
    partitioning the at least one of the logical blocks unless a code rate exceeds a predetermined threshold or a read frequency characteristic indicates the data is read intensive.

8. An apparatus comprising:
    a storage media; and
    a spanning determination module configured to:
        receive an instruction to write multiple logical blocks of data to the storage media;
        determine whether a read frequency characteristic of the data and a code rate of the data satisfy predetermined criteria;
        write the data by partitioning at least one of the multiple logical blocks between two or more pages of the flash storage device responsive to a determination that the read frequency characteristic of the data and the code rate of the data satisfy the predetermined criteria; and
        write the data without partitioning any of the multiple logical blocks responsive to a determination that the read frequency characteristic of the data and the code rate of the data do not satisfy the predetermined criteria.

9. The apparatus of claim 8, wherein the multiple logical blocks are stored in a first garbage collection unit (GCU) of a storage media.

10. The apparatus of claim 9, further comprising:
    a controller configured to copy the multiple logical blocks from the first GCU to another GCU in a format based on whether any of the multiple logical blocks are to be partitioned between the two or more pages.

11. The apparatus of claim 9, wherein the spanning determination module is further configured to:
    write a first subset of the multiple logical blocks to a second GCU in a spanned format; and
    write a second subset of the multiple logical blocks to a third GCU in a non-spanned format.

12. The apparatus of claim 9, wherein the spanning determination module is further configured to:
    determine whether a ratio of valid data to invalid data of the GCU satisfies a first condition;
    determine whether a read frequency of the valid data satisfies a second condition; and
    determine whether a code rate of the GCU satisfies a third condition.

13. The apparatus of claim 12, wherein the spanning determination module is further configured to:
    write the data in a non-spanned format if each of the first condition, the second condition, and the third condition are satisfied.

14. A method comprising:
    receiving a command requesting that valid data of a first garbage collection unit (GCU) be copied to a second GCU;
    determining whether to partition at least one logical block including the valid data into two or more pages based on read frequency characteristics of the valid data and a code rate of the data; and
    responsive to the determining operation, writing the valid data to the second GCU, the second GCU including exclusively spanned data or exclusively non-spanned data after execution of the command.

15. The method of claim 14, further comprising:
    determining whether a ratio of valid data to invalid data of the first GCU satisfies a first condition; and
    determining whether a read frequency of the valid data satisfies a second condition.

16. The method of claim 15, further comprising:
    determining whether to partition the at least one logical block based on satisfaction of the first condition and the second condition.

17. The method of claim 14, further comprising:
partitioning the at least one logical block unless a code rate of the valid data exceeds a predetermined threshold or a read frequency characteristic indicates the valid data is read intensive.

* * * * *